United States Patent
Hayasaka

[11] Patent Number: 5,907,432
[45] Date of Patent: May 25, 1999

[54] OPTICAL DEVICE FOR OBSERVING ERECTED IMAGE

[75] Inventor: Toshimi Hayasaka, Hachioji, Japan

[73] Assignee: Olympus Optical Co., Ltd., Tokyo, Japan

[21] Appl. No.: 08/911,777

[22] Filed: Aug. 15, 1997

[30] Foreign Application Priority Data

Aug. 21, 1996 [JP] Japan ................................. 8-220045
Aug. 12, 1997 [JP] Japan ................................. 9-217615

[51] Int. Cl.⁶ .......................... G02B 21/00; G02B 21/22; G02B 5/04
[52] U.S. Cl. .......................... 359/384; 359/368; 359/376; 359/834
[58] Field of Search .................... 359/368, 373, 359/384, 831, 834, 835, 375, 376; 396/373–386

[56] References Cited

U.S. PATENT DOCUMENTS

| | | | |
|---|---|---|---|
| 4,412,727 | 11/1983 | Taira | 359/375 |
| 4,643,541 | 2/1987 | Matsubara | 359/384 |
| 4,798,451 | 1/1989 | Fujiwara | 359/375 |
| 5,543,962 | 8/1996 | Kitajima et al. | 359/384 |

FOREIGN PATENT DOCUMENTS

| | | | |
|---|---|---|---|
| 62-287213 | 12/1987 | Japan . | |
| 1-164401 | 11/1989 | Japan . | |
| 6-175030 | 6/1994 | Japan . | |
| 233323 | 9/1925 | United Kingdom | 359/835 |

Primary Examiner—Cassandra Spyrou
Assistant Examiner—Mark A. Robinson
Attorney, Agent, or Firm—Frishauf, Holtz, Goodman, Langer & Chick

[57] ABSTRACT

A lens barrel applied to a stereo-microscope comprising a static section, an image forming lens section provided in the static section, a movable section rotatably supported by the static section, an eyepiece section supported by the movable section, an erecting optical section, provided in the static section, for erecting an observing image to be formed by a beam emitted from the image forming lens, a reflecting optical section for reflecting the beam emitted from the erecting optical section, a guiding optical section, provided in the movable section, for guiding the beam reflected by the reflecting optical section to the eyepiece section, and a varying mechanical section for varying an angle of a reflective surface of the reflecting optical section such that the beam image reflected by the reflecting optical section is guided to the eyepiece section through the guiding optical section in accordance with a rotation of the movable section from the static section.

24 Claims, 9 Drawing Sheets

FIG. 13

OPTICAL DEVICE FOR OBSERVING ERECTED IMAGE

BACKGROUND OF THE INVENTION

The present invention relates to an optical device such as a stereo-microscope, and particularly to an optical device using a lens barrel capable of continuously varying an inclination angle of an eyepiece section, for observing an erected image.

Generally, stereo-microscopes are often used to inspect the appearance of semiconductor chips for a long period of time. At the time of the observation, if the observer continues to observe with an uncomfortable posture, the observer becomes fatigued due to stress caused in muscle, thereby making it difficult to perform the observation for a long period of time.

In order to reduce the observer's fatigue, there are proposed various kinds of lens barrels, which can arbitrarily vary the inclination angle of the eyepiece section to adjust to the observer's body and posture.

Figure 1:
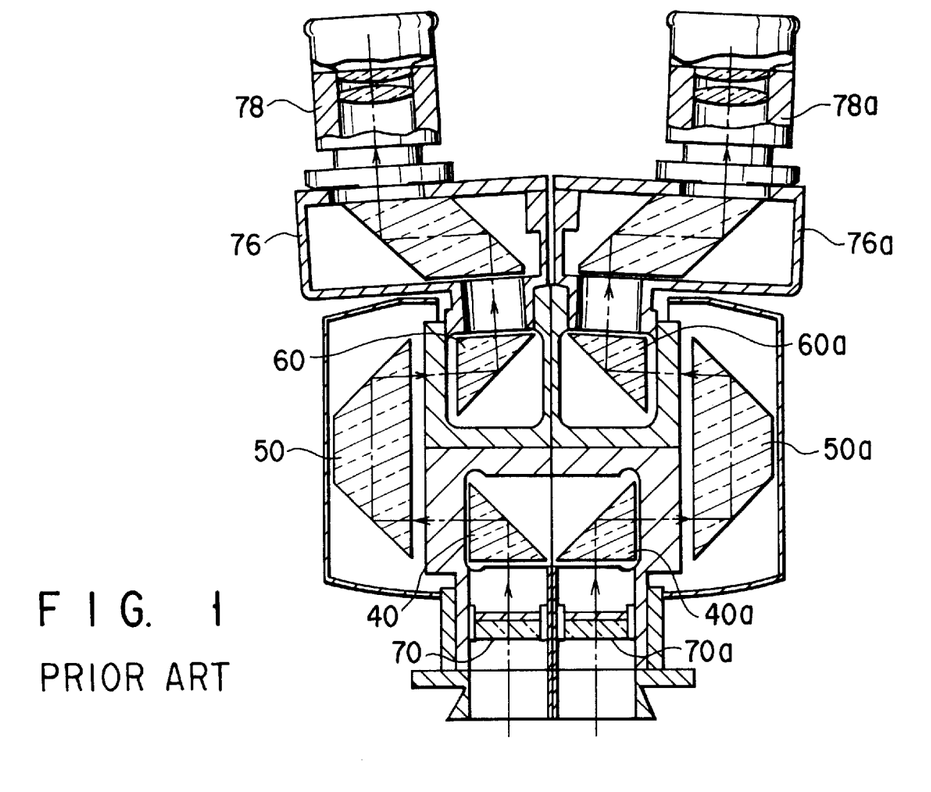
FIG. 1 is a view showing one conventional lens barrel for a stereo-microscope.

FIG. 1 shows a lens barrel disclosed in Japanese Utility Model Application KOKAI Publication No. 1-164401. As shown in FIG. 1, beams emitted from lenses 70, 70a are reflected by incident prisms 40, 40a, and made incident onto rectangular prisms 50, 50a. The beams reflected by the rectangular prisms 50, 50a are reflected by emission prisms 60, 60a, and made incident onto eyepiece casing sections 76, 76a. The beam emitted from the eyepiece casing sections 76, 76a image-form an image, which is from an object lens, on image surfaces of eyepiece sections 78, 78a.

In this case, a first rotation shaft is formed around the emission optical axes of the incident prisms 40, 40a. By means of the first rotation shaft, the rectangular prisms 50, 50a can be rotated against the incident prisms 40, 40a. Also, a second rotation shaft is formed around the emission optical axes of the rectangular prisms 50, 50a. By means of the second rotation shaft, the emission prisms 60, 60a and the eyepiece casing sections 76, 76a can be rotated against the rectangular prisms 50, 50a. The rotations of the rectangular prisms 50, 50a against the incident prisms 40, 40a and those of the emission prisms 60, 60a against the rectangular prisms 50, 50a are interlocked with each other, so that both prisms are rotated by the same angle in the same direction.

According to the above-structured lens barrel, even if the eyepiece casing sections 76, 76a are rotated, the inclination angle of the lens barrel can be continuously changed. Moreover, an object image formed on the image surface of the eyepiece sections 78, 78a by the lenses 70, 70a are reverted at their upper and lower and right and left positions by the incident prisms 40, 40a, the rectangular prisms 50, 50a, and the emission prisms 60, 60a. Then, the observing image at the eyepiece sections is an erect image.

Figure 2:
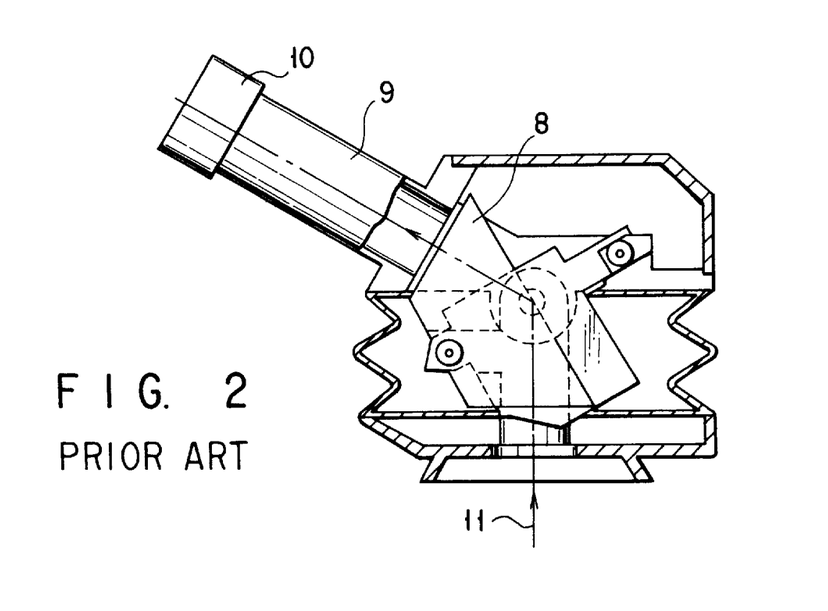
FIG. 2 is a view showing the other conventional lens barrel for a stereo-microscope.

FIG. 2 shows a lens barrel disclosed in Japanese Patent Application KOKAI Publication No. 6-175030. As shown in FIG. 2, a beam 11 from the object lens is reflected by a roof prism 8, and made incident onto an eyepiece section 9.

In this case, the eyepiece section 9 is rotated and supported such that the eyepiece section 9 can rise and fall. Then, the roof prism 8 is rotated by ½ of a rotation angle of the eyepiece section 9 through a synchronizing mechanism (not shown) synchronizing with the rotation of the eyepiece section 9.

According to the above-structured lens barrel, even if the inclination angle is continuously changed by the rise and fall operation of the eyepiece section 9, the beam 11 from the object lens is always guided to an eyepiece lens 10. As a result, the image position is not shifted. Moreover, the object image from the object lens is reverted at its upper and lower and right and left positions by the roof prism 8. Then, the observing image at the eyepiece section 10 is an erect image.

Figure 3:
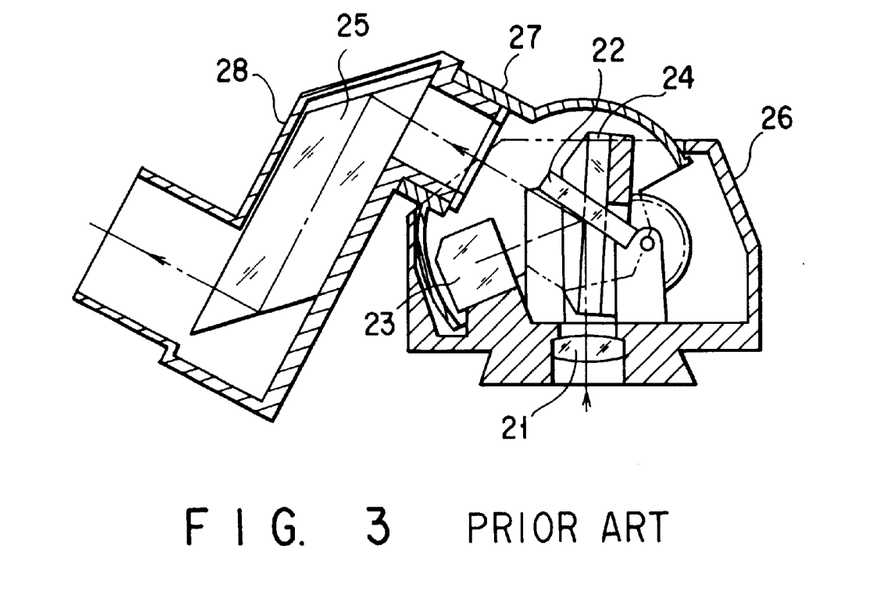
FIG. 3 is a view showing further other conventional lens barrel for a stereo-microscope.
Figure 4:
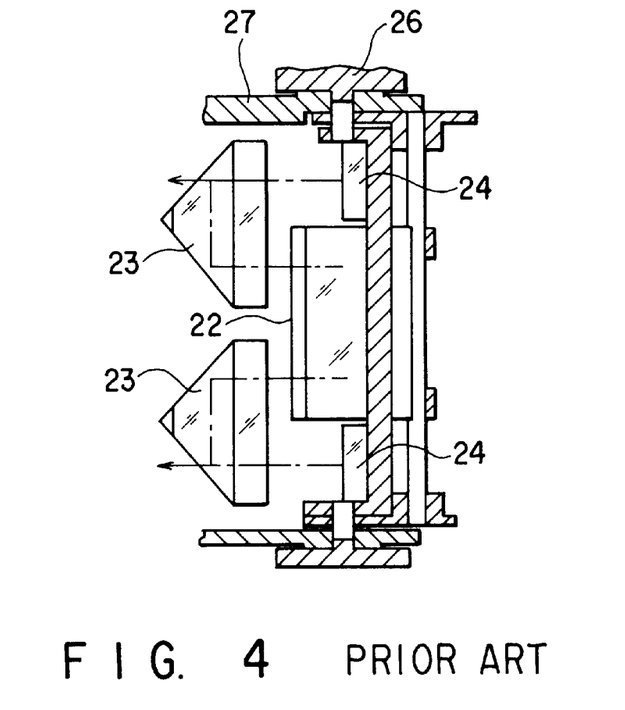
FIG. 4 is a view showing further other conventional lens barrel for a stereo-microscope.

FIGS. 3 and 4 show a lens barrel disclosed in Japanese Patent Application KOKAI Publication No. 62-287213. As shown in FIGS. 3 and 4, a beam emitted from an image forming lens 21 is deflected by a static reflective member 22, and made incident onto a rectangular prism 23. A beam emitted from the rectangular prism 23 is reflected by the rectangular prism 23 twice. Thereafter, the beam is made incident onto a rotation mirror 24. The beam reflected by the rotation mirror 24 is guided to an eyepiece lens through a diamond-shaped prism 25.

In this case, a movable section 27 is rotated and supported by a static section 26 such that the movable section can rise and fall. An eyepiece section is supported by the movable section 27 to be rotatable round its optical axis. The diamond-shaped prism 25 is built in the eyepiece section 28. The rotation mirror 24 is supported by the static section 26 to be rotatable round the movable section 27 as a central axis. Moreover, the rotation shaft of the movable section 27 is structured to be coaxial with that of the rotation mirror 24. The rotation mirror 24 is rotated by ½ of the rotation angle of the movable section 27 through a linkage mechanism (not shown) in accordance with the rotation of the movable section 27.

According to the above-structured lens barrel, even if the inclination angle of the movable section 27 is continuously changed, the beam from the object lens is always guided to the eyepiece lens. As a result, the image position is not shifted. Moreover, the object image from the object lens is reverted at its upper and lower and right and left positions by the static reflective member 22, the rectangular prism 23, and the rotation mirror 24. Then, the observing image at the eyepiece section is an erect image.

The lens barrel of FIG. 1 disclosed in Japanese Utility Model Application KOKAI Publication No. 1-164401 comprises an optical element serving as both an element for erecting the image (which is essential for the stereo-microscope) and an element for varying the inclination angle of the lens barrel. There is a merit in that the number of optical elements constituting the optical device is small. However, since the rectangular prisms 50, 50a, and the emission prisms 60, 60a are relatively rotated respectively, a frame for holding each prism is needed. Due to this, it is difficult to ensure an accurate relative position of each prism.

The eyepiece casing sections 76, 76a, which are operated to change the inclination angle of the lens barrel and to adjust an eye width, is held by first and second rotation shafts. Due to this, the eyepiece casing sections 76, 76a are easily influenced by an accurate error caused in manufacturing the rotation section.

Moreover, there was a problem in that a large number of processes for adjusting the optical axis is needed.

In the lens barrel of FIG. 2, since high manufacturing accuracy for the roof prism 8 is required, the manufacturing cost is increased.

Also, because the roof prism 8 is rotated by synchronizing with the eyepiece section 9, the angle, which is formed by the optical axis and the beam incident surface of the roof prism 8, is different depending on the inclination angle of the eyepiece section 9. As a result, there was a problem in that the center of the rotation of the roof prism 8 and the reflective point of the roof prism 8 are shifted, and in that the roof prism must be formed in an afocal optical system.

Moreover, when the lens barrel of FIG. 2 is applied to a Galilean stereo-microscope, an eye width adjusting mechanism is needed. In the adjusting mechanism, each diamond prism (not shown) is provided between the eyepiece lens 10 and the roof prism 8. Then, the incident optical axes of the diamond prisms are used as rotation shafts, and the diamond prisms are rotated. Thereby, the right and left optical axes to adjusted to the observer's eye width. The Galilean stereo-microscope is a stereo-microscope, which comprises a parallel optical system having a pair of parallel optical paths formed at a back of the object lens.

However, the distance between the right and left optical axes is fixed until the beams are made incident onto the diamond prisms. In the Galilean stereo-microscope, the distance is restrained by the size of the object lens, the focal distance, and the numerical aperture. As a result, the distance is not increased, and the structure of the rotation mechanism for rotating the prisms in which the incident optical axes are rotated as rotation shafts becomes complicated. Also, there is a problem in that a visual viewing field is not enlarged by the restriction of the rotation shaft mechanism. Moreover, it is difficult to apply the lens barrel of FIG. 2 to a three-eye barrel to which an optical path for photographing is added.

In the lens barrel of FIGS. 3 and 4, the beam emitted from the image forming lens 21 is reflected toward the rectangular prism 23 by the fixed reflective member 22. In this case, the rectangular prism 23 is positioned at the eyepiece section 28. Due to this, the angle of the indecent optical axis (barrel inclination angle) to the eyepiece section 28 cannot be set to a range from 0° (the horizontal) to 20° against the horizontal. Such an angle range maybe suitable for a long time observation using the microscope. It can be, of course, considered that the rectangular prism 23 is retreated to the position where the setting of the suitable angle range is not prevented by the rectangular prism 23. In this case, the distance between the static reflective member 22 and the rectangular prism 23 and the distance between the rectangular prism 23 and the rotation mirror 24 are increased. As a result, the lens barrel cannot be structured in the optical path length, which is determined by the focal distance of the image forming lens 21.

Moreover, it can be considered that the beam emitted from the image forming lens 21 is reflected to be opposite to the eyepiece section 28 by the static reflective member 22. However, in this case, the angle formed by the optical axis of the emitted beam and the reflected surface of the rotation mirror 24 is extremely small. As a result, it is difficult to set the inclination angle of the lens barrel to the range from 0° (the horizontal) to 20° which is suitable for the long period of observation using the microscope.

Furthermore, it is difficult to apply the lens barrel of FIGS. 3 and 4 to the three-eye barrel to which the optical path for photographing is added.

In consideration of the above-mentioned problems, the present invention has been made. An object of the present invention is to provide a lens barrel, a stereo-microscope, and an optical device, which can observe a real image in a condition that an inclination angle of the barrel can be continuously varied in a range resisting a long time observing, with a simple structure and at low cost.

BRIEF SUMMARY OF THE INVENTION

The above object can be achieved by a lens barrel applied to the following stereo-microscope.

Specifically, there is provided a lens barrel applied to a stereo-microscope, comprising:

a static section;

an image forming lens section provided in the static section;

a movable section rotatably supported by the static section;

an eyepiece section supported by the movable section;

an erecting optical section, provided in the static section, for erecting an observing image to be formed by a beam emitted from the image forming lens;

a reflecting optical section for reflecting the beam emitted from the erecting optical section;

a guiding optical section, provided in the movable section, for guiding the beam reflected by the reflecting optical section to the eyepiece section; and a varying mechanical section for varying an angle of a reflective surface of the reflecting optical section such that the beam image reflected by the reflecting optical section is guided to the eyepiece section through the guiding optical section in accordance with a rotation of the movable section from the static section.

Moreover, the above object can be achieved by the following stereo-microscope.

More specifically, there is provided a stereo-microscope comprising:

a main body;

an object lens provided in the main body;

a magnification varying section, provided in the main body, for receiving a beam from the object lens to varying the magnification of each of right and left optical images based on the beam, and a lens barrel provided in the main body, the lens barrel comprising:
a static section provided in the main body;
an image forming lens section, provided in the static section, for image-forming each of right and left beams emitted from the magnification varying section;
a movable section rotatably supported by the static section;
an eyepiece section supported by the movable section;
an erecting optical section, provided in the static section, for erecting each of the right and left optical images emitted from the image forming lens section;
a reflecting optical section for reflecting the right and left beams emitted from the erecting optical section;
a guiding optical section, provided in the movable section, for guiding each of the right and left beams reflected by the reflecting optical section to the eyepiece section; and
a varying mechanical section for varying an angle of a reflective surface of the reflecting optical section such that each of the right and left optical beams reflected by the reflecting optical section is guided to the eyepiece section through the guiding optical section in accordance with a rotation of the movable section from the static section.

Furthermore, the above object can be achieved by the following optical device.

More specifically, there is provided an optical device comprising:

a main body;

an object lens provided in the main body;

an optical section, provided in the main body, for optically treating a beam emitted from the object lens;

a static section provided in the main body;

a movable section rotatably supported by the static section;

an eyepiece supported by the movable section;

an erecting optical section, provided in the static section, for erecting an optical image emitted from the optical section;

a reflecting optical section, provided in the static section, for reflecting the beam emitted from the erecting optical section;

a guiding optical section, provided in the movable section, for guiding the beam reflected by the reflecting optical section to the eyepiece; and a varying mechanical section for varying an angle of a reflective surface of the reflecting optical section such that the beam reflected by the reflecting optical section is guided to the eyepiece section through the guiding optical section in accordance with a rotation of the movable section from the static section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention will be described with reference to FIGS. 5 to 10.

Figure 5:
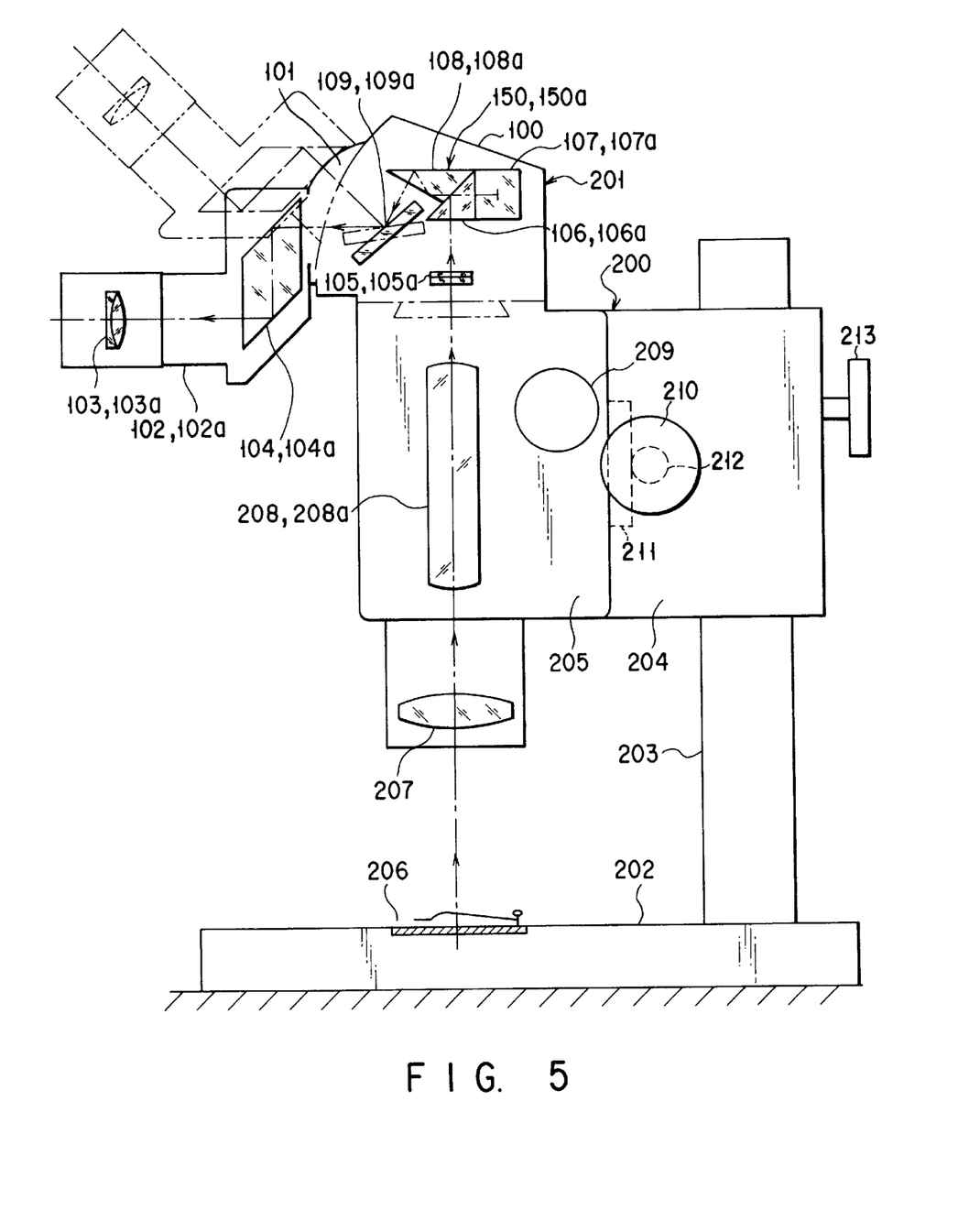
FIG. 5 is a side view showing a stereo-microscope to which a lens barrel of a first embodiment of the present invention is applied.
Figure 6:
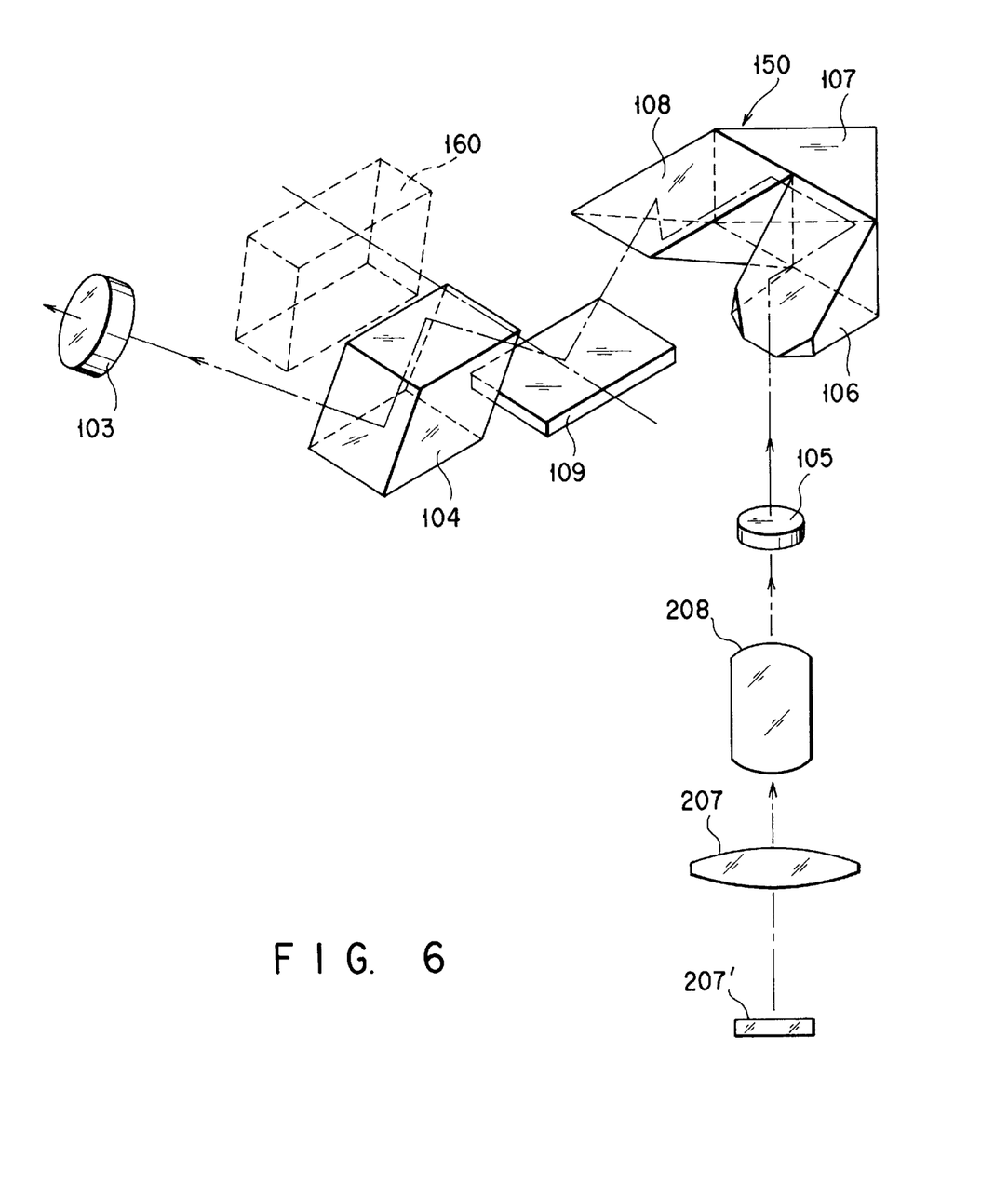
FIG. 6 is a perspective view showing a part of an optical system of the first embodiment of the present invention.

The present invention is preferably applied to an optical device for observing an erect image, typically a stereo-microscope. The first embodiment is a stereo-microscope. As shown in FIGS. 5 and 6, the stereo-microscope comprises a main body 200, a lens barrel 201. The lens barrel 201 includes a static section 100, a movable section 101, and an eyepiece section 102.

The main body 200 includes a base 202, a support 203, and a moving member 204. The support 203 is provided to be right angles with the base 202. The moving member 204 is provided to be slidable to the support 203. The moving member 204 is fixed to the support 203 by a static knob 213. A magnification varying section (variable power unit) 205 is attached to the moving member 204 by a focal knob 210 to be movable. A sample supporting member 206 is provided on the base 202. The magnification varying section 205 has an object lens 207, magnification lenses 208, 208a, and a magnification knob 209. By the adjustment of the focal knob 210, a rack 211 and a pinion 212 are moved, and the moving member 204 is moved up and down.

The static section 100 of the lens barrel 201 comprises image forming lenses 105, 105a, and prism assemblies 150, 150a. The image forming lenses 105, 105a form a left beam (right beam) emitted from the magnification lenses 208, 208a, respectively. The prism assemblies 150, 150a are erecting optical sections, which erect left beam image based on the left beam (right beam image based on the right beam) from the image forming lenses 105, 105a, respectively. The static section 100 is rotated and supported such that the movable section 101 of the lens barrel 201 can rise and fall. The center of the rotation of the movable section 101 is set to be right angles with the optical axis of each of the left beam (right beam). The movable section 101 comprises diamond prisms 104, 104a, serving as light introducing optical sections. An eyepiece section 102 is supported to be rotatable. Rotation mirrors 109, 109a, serving as light reflecting optical sections, and gear mechanism 160, serving as a varying mechanism or a reduction mechanism, are incorporated into the static section 100 and the movable section 101.

The prism assemblies 150, 150a comprise triangular prisms 106, 106a, rectangular prisms 107, 107a, and twice reflecting triangular prisms 108, 108a. In this case, each of the triangular prism 106, 106a contacts one half of the bottom surface of each of the rectangular prisms 107, 107a. Each of the triangular prisms 108, 108a contacts the other half of the bottom surface of each of the rectangular prisms 107, 107a twice.

In the above-structured prism assemblies 150, 150a, beams, which are made incident from the triangular prisms 106, 106a, are reflected on their bottom surfaces, respectively. The reflected beams are made incident onto the bottom surfaces of the rectangular prisms 107, 107a. The beams, which are made incident onto the bottom surfaces of the rectangular prisms 107, 107a, are reflected by first reflective surfaces of the rectangular prisms 107, 107a, respectively. The reflected beams are further reflected by second reflective surfaces of the rectangular prisms 107, 107a. The reflected beams are made into twice reflecting triangular prisms 108, 108a and reflected in a direction along the paper surface of FIGS. 5 and 7, and reach the rotation mirrors 109, 109a.

The following will further explain the first embodiment of the present invention.

Figure 7:
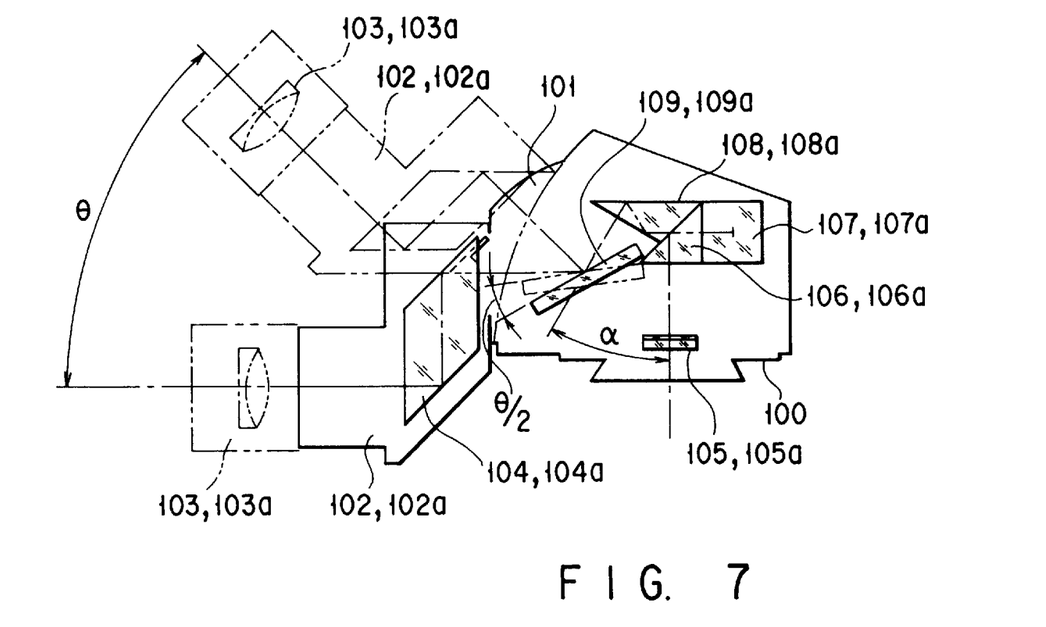
FIG. 7 is a side view showing only the lens barrel of the first embodiment of the present invention.
Figure 8:
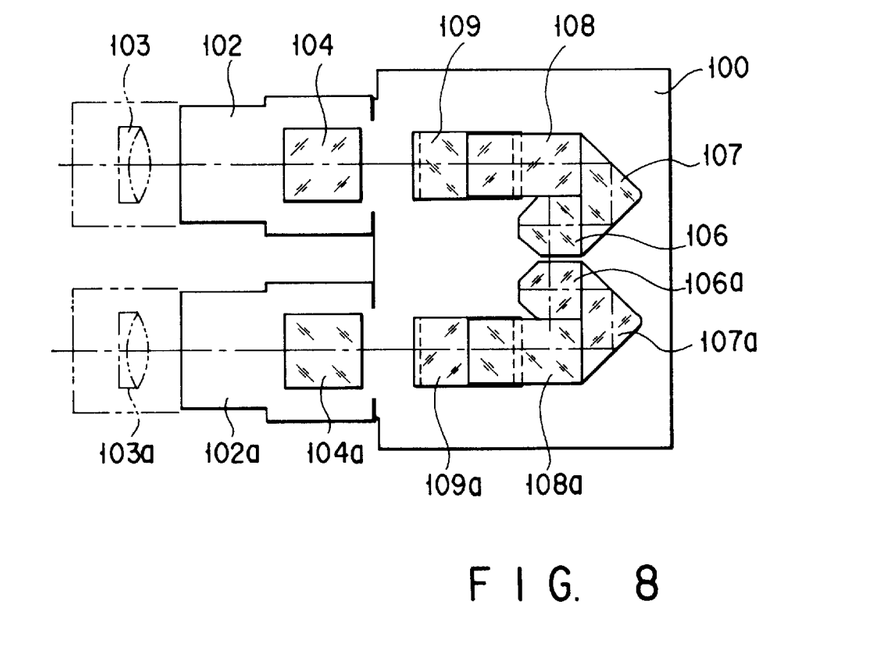
FIG. 8 is a plane view showing only the lens barrel of the first embodiment of the present invention.

As shown in FIGS. 7 and 8, the centers of the rotation shafts to the movable section 101 of the eyepiece sections 102, 102a are placed at the positions corresponding to the optical axes of the beams, which are made incident onto the diamond prisms 104, 104a, respectively. The image forming lenses 105, 105a are formed on the static section 100. Each of the image forming lenses 105, 105a image-forms the beam from the main body of the microscope on the image surface of the each of eyepieces 103, 103a. Then, the triangular prisms 106, 106a are arranged to be opposite to these image forming lenses 105, 105a. Then, the beams from the image forming lenses 105, 105a are reflected to be right angles with the directions opposite to the eyepiece sections 102, 102a, respectively. In this case, the reflection angle is not necessarily a right angle.

Moreover, the rectangular prisms 107, 107a are placed to be opposite to the emission surfaces of the triangular prisms 106, 106a, respectively. The rectangular prisms 107, 107a reflect emission beams from the triangular prisms 106, 106a twice, respectively. In other words, the emission beams are reflected in a direction perpendicular to the paper surface of FIG. 7 and a direction along the paper surface of FIG. 7. As a result, the beams, which are parallel to the emission beams of the triangular prisms 106, 106a and which are opposite to the directions of the emission beams thereof, are emitted, respectively.

The twice reflecting triangular prisms 108, 108a are placed to be opposite to the emission surfaces of the rectangular prisms 107, 107a, respectively. The triangular prisms 108, 108a reflect emission beams from the rectangular prisms 107, 107a twice along the paper surface of FIG. 7, respectively, and emits beams to the rotation mirrors 109, 109a with a predetermined angle, respectively. In other words, an angle α, which is formed by the optical axis of the beam emitted from each of the triangular prisms 108, 108a and the optical axis (vertical axis) of the beam emitted from each of the image forming lenses 105, 105a, is set to an acute angle of about, e.g., 15 to 45°. The acute angle of about 15 to 45° is in a range that an angle θ (inclination angle of the lens barrel) is easily set to 0 to 45°, which is often used for the stereo-microscope. In this case, the angle θ is formed by the optical axis of each of the eyepiece lenses 103, 103a and the horizontal surface. These triangular prisms 106, 106a, the rectangular prisms 107, 107a, and the triangular prisms 108, 108a are connected to each other, and fixed to the static section 100, respectively.

The rotation mirrors 109, 109a deflect the beams emitted from the triangular prisms 108, 108a. These deflected beams are guided to the diamond prisms 104, 104a of the eyepiece sections 102, 102a. In this case, the rotation mirrors 109, 109a are positioned such that their reflected surfaces are conformed to the center of the rotation shaft of the moving section 101. Then, the rotation mirrors 109, 109a are supported by the movable section 101 such that they are rotated to be concentric with the rotation shaft center of the movable section 101. Also, by synchronizing with the rotation of the movable section 101, the rotation mirrors 109, 109a are rotated in the same direction as the movable section 101 by only θ/2 of the rotation angle of the movable section 101.

The operation of the above-explained rotation mirrors 109, 109a can be achieved by the gear mechanism 160. More specifically, by synchronizing with the rotation of the movable section 101 to the static section 100, the gear mechanism 160 changes the angles of the reflected surfaces of the rotation mirrors 109, 109a, respectively. The change of the angles is performed such that the left beam (right beam) reflected by the rotation mirrors 109, 109a are guided to the eyepiece sections 102, 102a through the diamond prisms 104, 104a, respectively. Also, the change of the angles is achieved by the rotation of each of the rotation mirrors 109, 109a.

Figure 9:
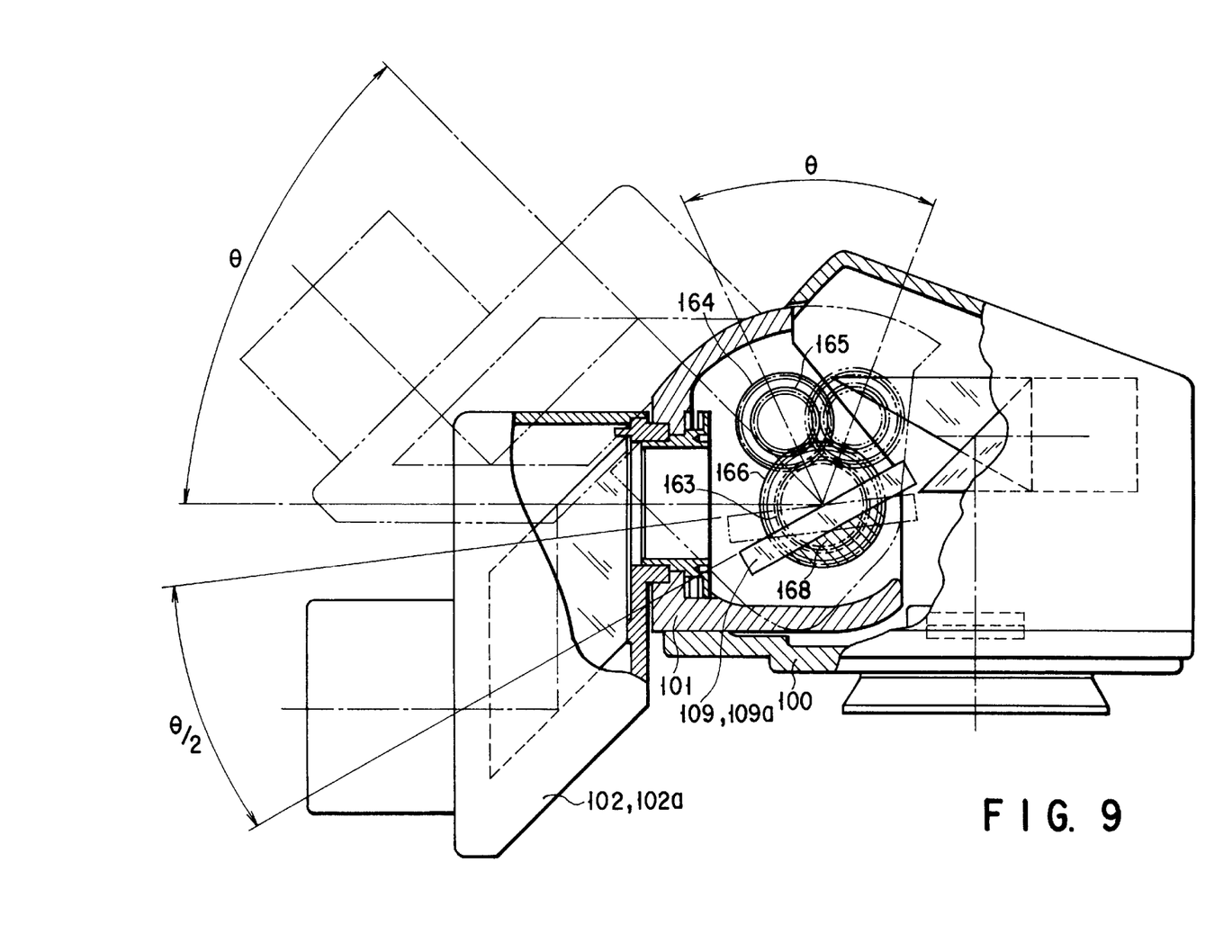
FIG. 9 is an upper surface view, partially broken, showing a gear mechanism for changing an angle of a reflected surface.
Figure 10:
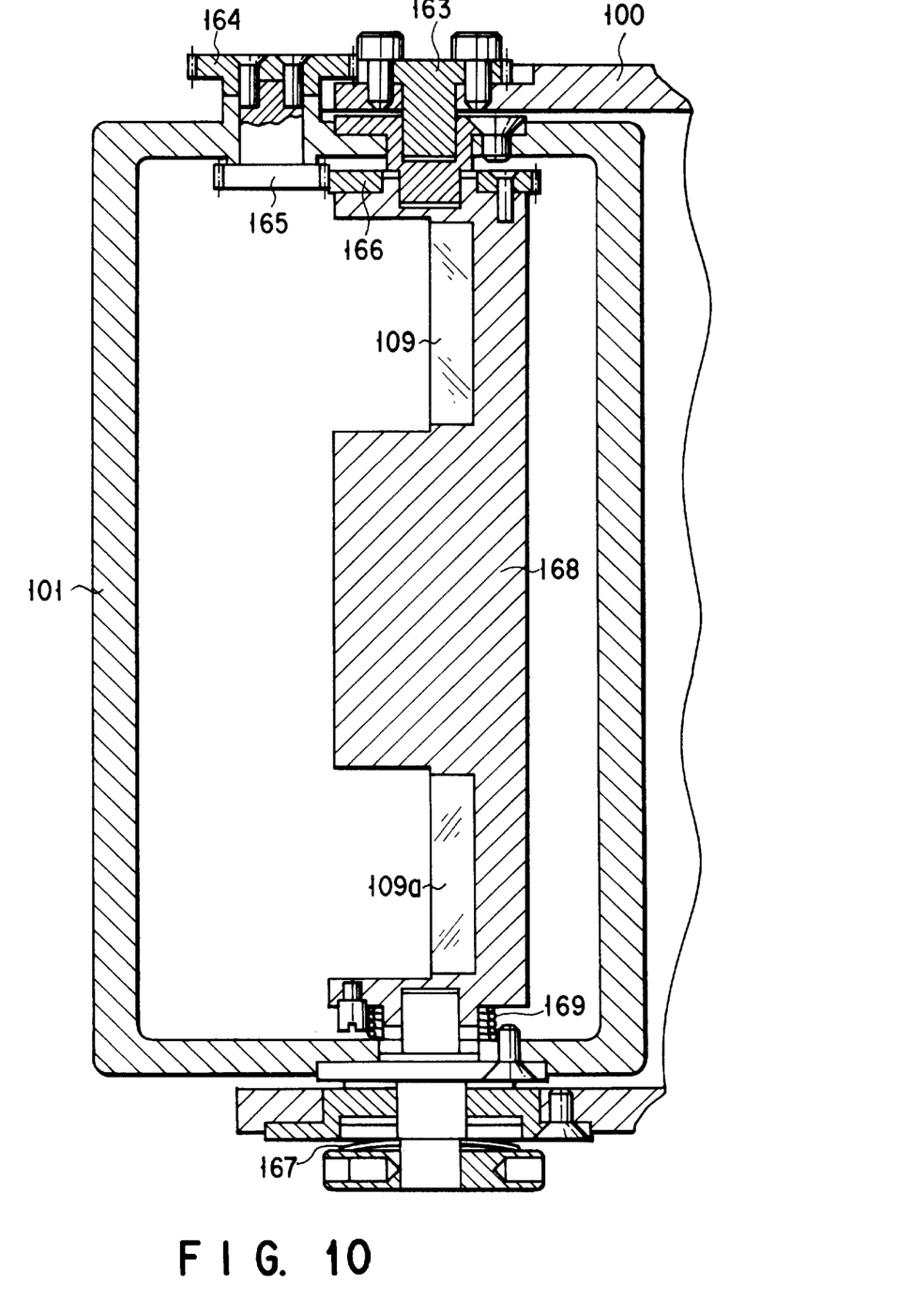
FIG. 10 is a plane view, partially broken, showing a function of a reflective mirror.

More specifically, the gear mechanism 160 and the rotation mechanism section will be explained with reference to FIGS. 9 and 10. The movable section 101 is supported to be rotatable by the static section 100. In this case, the shaft center, which is right angles with each optical axis of each beam emitted from each of the prism assembly 150, 150a, is set as the rotation shaft center. Moreover, frictional force is given to the movable section 101 by a plate spring 161, which is structured to be concentric with the rotation shaft center. Thereby, the movable section 101 can be stopped at an arbitrary angle to the static section 100.

A mirror holding frame 162 is provided in the movable section 101. The mirror holding frame 162 is rotatably supported to be concentric with the rotation shaft center of the movable section 101.

Moreover, each of rotation mirror 109, 109a is fixed to the mirror holding frame 162 as one body. The rotation mirror has a reflective surface, which is parallel to the rotation shaft center, and includes the rotation shaft center.

A gear 163 is fixed to the static section 100 as one body such that the rotation shaft center is set as a shaft center. A gear 164 is provided to be engaged with the gear 163. The gear 164 is rotatably supported by the movable section 101, and a ratio of the gear 163 to the gear 164 in the number of gear tooth is set to be 1:1.

A gear 165 is fixed to the gear 164 as one body to be concentric with the gear 164.

A gear 166 is fixed to the mirror holding frame 162 as one body such that the rotation shaft center of the mirror holding frame 162 is set as a shaft center. The gears 165 and 166 are engaged with each other. A ratio of the gear 165 to the gear 166 in the number of gear tooth is set to be 1:2.

The mirror holding frame 162 has a twist coil spring 163 on its one end. The twist coil spring 163 urges the mirror holding frame 162 in the rotation direction. The twist coil spring 163 also urges the gear 166 fixed to the mirror holding frame 162 in the rotation direction. As a result, a backlash caused between the respective gears can be removed. In other words, the twist coil spring 163 is provided between the mirror holding frame 162 and the movable section 101 so as to urge the mirror holding frame 162 in the rotation direction against the movable section 101, thereby removing the backlash of the gear mechanism 160.

If the movable section 101 is rotated at θ clockwise, the position of the rotation shaft center of the gears 164 and 165 revolves around the rotation shaft center of the movable section 101 by θ clockwise. As a result, the gear 166 engaging with the gear 165 rotates by θ clockwise. However, the gear 163 engaging with the gear 164 is fixed to the static section 100 as one body. Therefore, the ratio of the gear 163 to the gear 164 in the number of gear tooth is 1:1. The gears 164 and 165 rotate on their axes by θ clockwise during the period when they revolve around the rotation shaft center of the movable section 101 by θ. As a result, the gear 166 engaging with the gear 165 is rotated by θ/2 anticlockwise by the rotation of the gear 165 since the ratio of the gear 165 to the gear 166 in the number of gear tooth is 1:2. Therefore, the rotation angle of the gear 166 can be expressed by the following equation:

θ (angle rotated clockwise by the revolution of gear 165)−θ/2 (angle rotated anticlockwise by the rotation of the gear 165)=θ/2 (θ/2 rotation clockwise).

In other words, when the movable section 101 is rotated by θ clockwise, each of the rotation mirrors 109, 109a, which is formed with the gear 166 as one body, is rotated by θ/2 in the same direction. As a result, the optical axis of each beam, which is reflected by each of the rotation mirror 109, 109a and made incident onto each of the eyepiece sections 102, 102a, is not shifted even if the movable section 101 is rotated. Since the backlash caused between the respective gears can be removed by the twist coil spring, the rotation mirrors 109, 109a are correctly rotated by synchronizing with the rotation of the movable section 101.

In this case, the gear ratio is not limited to the above-mentioned example. For example, it is assumed that the number of the gears 163 is A, that of the gears 164 is B, that of the gears 165 is C, and that of the gears 166 is D. The number of the gears may be set to satisfy the equation of A/B×C/D=1/2. In this case, since the gears 163 and 164 and the gears 165 and 166 are engaged with each other, respectively, the number of the respective gears must satisfy the equation of A+B=C+D.

Next, the following will explain the operation of the above-structured first embodiment.

A beam sent from a main body of a microscope 200 is made incident onto the respective triangular prisms 106, 106a through the respective image-forming lenses 105, 105a. Then, the beam is reflected in a direction along the paper surface of FIG. 7 so as to be made incident onto the respective rectangular prisms 107, 107a.

Then, the beam is reflected in a direction perpendicular to the paper surface of FIG. 7 by the respective rectangular prisms 107, 107a. The beam is emitted as a beam, which is parallel to the emission light of the respective triangular prisms 106, 106a and which is opposite thereto, and made incident onto the respective triangular prisms 108, 108a. Moreover, the beam is reflected twice in a direction along the paper surface of FIG. 7 by the respective triangular prisms 108, 108a so as to be directed to the respective rotation mirrors 109, 109a. Then, the beam is reflected by the respective rotation mirrors 109, 109a so as to be made incident onto the respective diamond-shaped prisms 104, 104a of the eyepiece sections 102, 102a. Then, the beam is reflected twice by the respective diamond-shaped prisms 104, 104a. Thereby, an object image is formed on each of the eyepiece lenses 103, 103a.

In this case, the object images from the respective image forming lenses 105, 105a are reverted at their upper and lower and right and left positions by the triangular prisms 106, 106a, the rectangular prisms 107, 107a, the triangular prisms 108, 108a, and the rotation mirrors 109, 109a. As a result, the object images can be observed as an erected image through the eyepiece lenses 103, 103a.

When the movable section 101 is rotated in a rise and fall direction to change the inclination angles of the respective eyepiece sections 102, 102a, the rotation mirrors 109, 109a are rotated by a gear mechanisms 160 in the same direction as the movable section 101 by only θ/2 of the rotation angle of the movable section 101, by linking with the change of the inclination angle θ of each of the eyepiece section 102, 102a. As a result, the inclination angle θ of each of the eyepiece section 102, 102a can be continuously changed without shifting the image position at the each of the eyepiece lenses 103, 103a. In other words, by rotating the rotation mirrors 109, 109a by θ/2°, the beam reaching the respective rotation mirrors 109, 109a from the respective triangular prisms 108, 108a can be incident onto the respective diamond-shaped prisms 104, 104a of the movable section 101 rotated at θ°. This is obvious from the law of reflection.

On the other hand, the eyepiece sections 102, 102a are rotated around the center of the optical axis of the incident light of the diamond-shaped prisms 104, 104a in the direction opposite to each other. Thereby, the eyepiece sections can be adjusted to the distance between both observer's eyes, and the observer can observe the object image in a stable state. In this case, since the rotation shafts of the eyepiece sections 102, 102a are conformed to the incident optical axes, the image position of each of the eyepiece lenses 103, 103a is not shifted.

Thus, since the image erecting optical elements and the rotation mirror are contained collectively in the static section 100, the accuracy of the respective optical elements can be easily ensured, the structure can be made simple, and the manufacturing cost can be reduced.

In the lens barrel of this embodiment, the rotation shaft of eyepiece section 101 is one shaft. As a result, the adjustment of the optical axis can be made easier than the conventional case of FIG. 1, and the assembly in the manufacture can be easily carried out.

Moreover, in the lens barrel of this embodiment, as compared with the conventional lens barrel of FIG. 2, expensive optical elements such as a roof prism, which needs high accuracy, are not required. As a result, the low manufacturing cost can be realized, and the adjustment of the optical axis can be easily made.

The distance between the optical axes of the beams, which are made incident onto the eyepiece sections 102, 102a, can be fully expanded by the rectangular prisms 107, 107a. As a result, the structure, having the rotation axis corresponding to the incident optical axis of each of the eyepiece sections 102, 102a, for adjusting the distance between both eyes can be made simple.

The optical axis of each of the beams, which is made incident onto the rotation mirrors 109, 109a from the triangular prisms 108, 108a, is not parallel to each of the emission optical axes (perpendicular) from the image forming lenses 105, 105a, and has the acute angle α. The emission surface of each of the triangular prisms 108, 108a corresponding to the rotation mirrors 109, 109a is inclined. As a result, even if the inclination angle θ of each of the eyepiece sections 102, 102a is varied in the range of e.g., from 0° to 45°, the beam emitted from each of the rotation mirrors 109, 109a is not interrupted by the emission surface of each of the triangular prisms 108, 108a where the beam is emitted to each of the rotation mirrors 109, 109a. As a result, the inclination angle θ of the lens barrel can be continuously varied in the wide range including the angle of 0° to 20°, which is suitable for the long time observation using the microscope. Moreover, the rotation mirrors 109, 109a can be placed to be close to the emission surfaces of the triangular prisms 108, 108a as possible, and the areas where the rotation mirrors 109, 109a are provided can be reduced. As a result, there can be realized the variation of the inclination angle θ of the lens barrel having the short length of the optical path.

Also, since there are used the triangular prisms 108, 108a, which reflect the beam in the direction of the optical axis twice, as a part of the optical element, the length of the optical path can be reduced. In other words, the twice reflecting triangular prisms 108, 108a partially use the reflective surface and the emission surface in common, the length of the optical path can be reduced.

In the above-explained first embodiment, the triangular prisms 106, 106a and the rotation mirrors 109, 109a were individually prepared to correspond to the incident beam from each of the image forming lenses 105, 105a. However, the triangular prisms 106 and 106a may be combined with each other to be formed as one prism. Also, the rotation mirrors 105 and 105a may be combined with each other to be formed as one mirror.

(Second embodiment)

Figure 11:
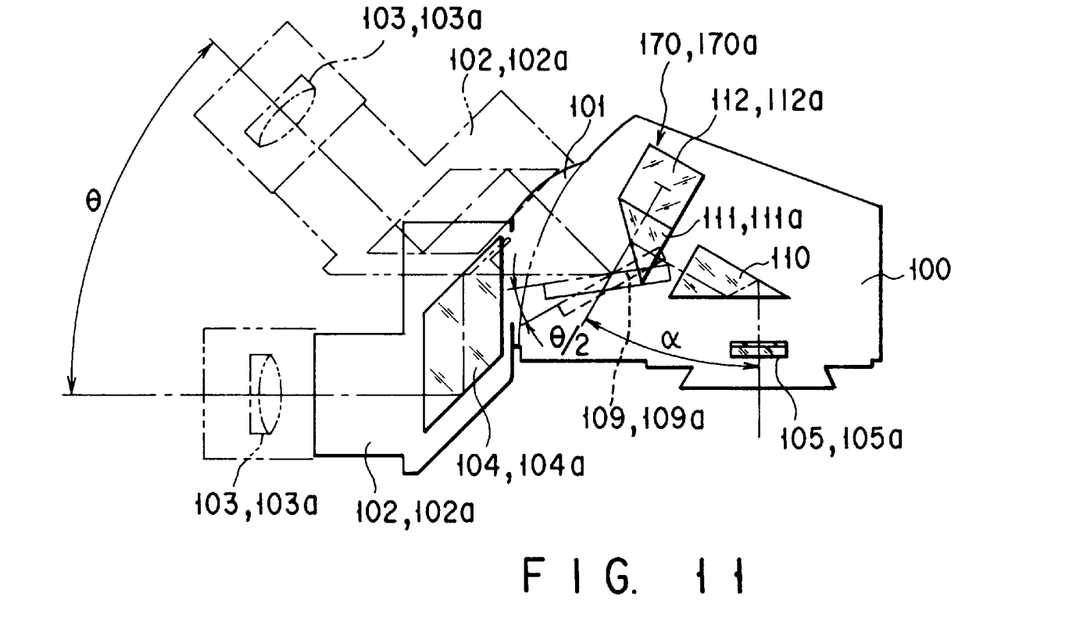
FIG. 11 is a side view showing a second embodiment of the present invention.
Figure 12:
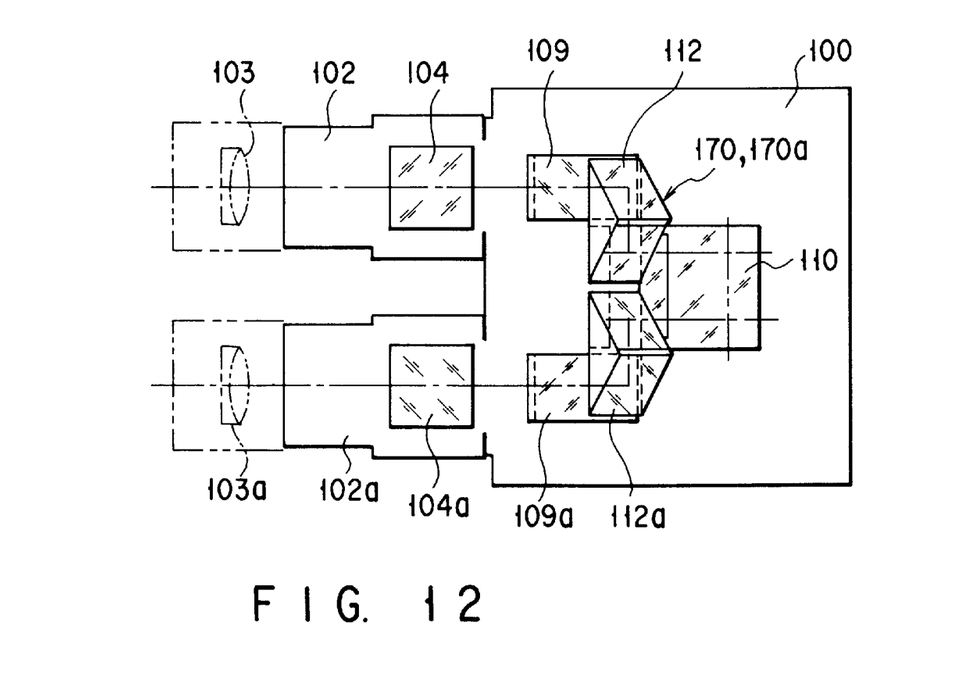
FIG. 12 is a plane view showing the second embodiment of the present invention.
Figure 13:
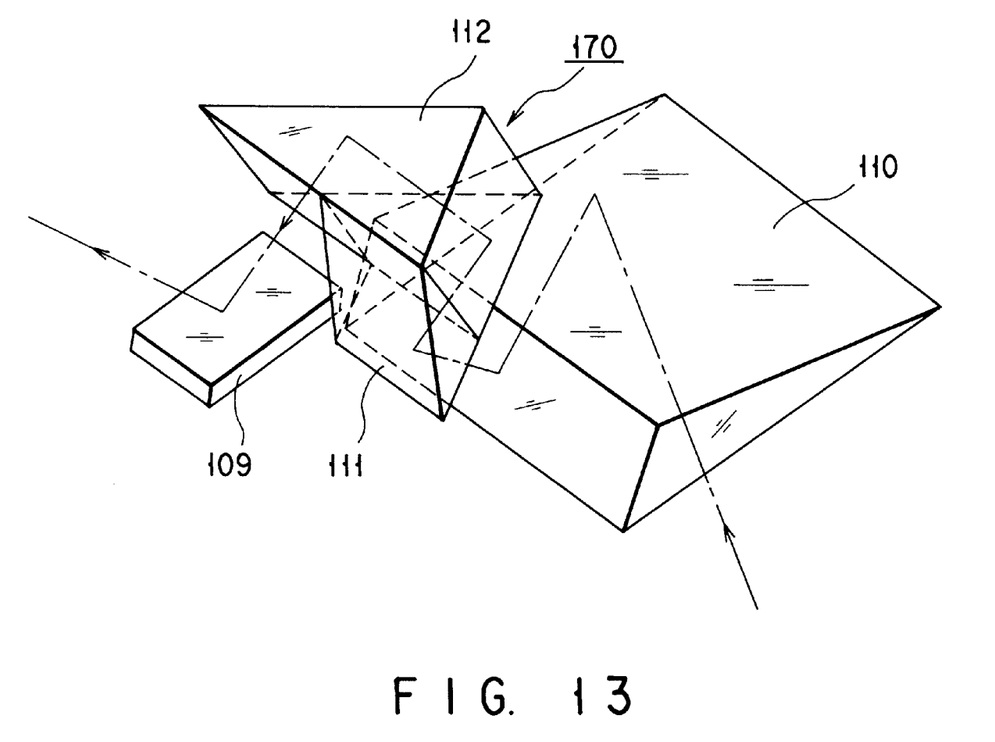
FIG. 13 is a perspective view showing a part of an optical system of the second embodiment of the present invention.

FIGS. 11 to 13 show the lens barrel of a second embodiment of the present invention. In these figures, the same reference numerals are added to the sections common to the FIGS. 5 to 10. The second embodiment is different from the first embodiment in the prism assembly. More specifically, as shown in FIGS. 11 to 13, each of prism assembly 170, 170a comprises a twice reflecting triangular prism 110, triangular prisms 111, 111a, and rectangular prisms 112, 112a. An incident surface of each of the triangular prisms 111, 111a is provided to be opposite to an emission surface of each of the triangular prisms 110, 110a to have a distance therebetween. An emission surface of each of the triangular prisms 111, 111a is placed to contact one half of the bottom side of each of the rectangular prisms 112, 112a. As a result, the beam is made incident onto the bottom surface of the triangular prism 110. Then, the beam is emitted from the other half of the bottom side of each of the rectangular prisms 112, 112a.

More specifically, twice reflecting triangular prism 110 is provided to corresponds to the image forming lenses 105, 105a. The triangular prism 110 reflects the emission beam from the image forming lenses 105, 105a twice. In other words, the triangular prism 110 reflects the emission beam in the direction along the paper surface of FIG. 11 so as to emit the beam to each of the triangular prism 111, 111a. Each of the triangular prisms 111, 111a reflects the beam from the twice reflecting triangular prism 110 to be right angles with the reflective surface of each of the triangular prisms 111, 111a. The beam is guided to each of the rectangular prisms 112, 112a. In this case, the reflection angle may be not always a right angle.

The rectangular prisms 112, 112a are placed to be opposite to the emission surfaces of the triangular prisms 111, 111a, respectively. Each of the rectangular prisms 112 reflects the emission beam from each of the triangular prisms 111, 111a. In other words, each of the rectangular prisms 111, 111a reflects the emission beam in the direction perpendicular to the paper surface of FIG. 11 and further reflects the beam along the paper surface of FIG. 11. As a result, the beam is emitted to each of the rotation mirrors 109, 109a with a predetermined angle. In this case, the angle α, which is formed by the optical axis of the beam emitting from each of the rectangular prisms 112, 112a and the optical axis of the beam emitted from each of the image forming lenses 105, 105a, is set to an acute angle of about, e.g., 15 to 45°. The acute angle of about 15 to 45° is in a range that an angle θ (inclination angle of the lens barrel), which is formed by the optical axis of each of the eyepiece lenses 103, 103a and the horizontal surface, is easily set to 0 to 45°, which is often used for the stereo-microscope. The triangular prisms 111, 111a, and the rectangular prisms 112, 112a are connected to each other, and fixed to the static section 100, respectively.

The other structure is the same as FIGS. 5 to 10.

Thus, according to the above-explained structure of the second embodiment, the emission surface of each of the rectangular prisms 112, 112a corresponding to the rotation mirrors 109, 109a is inclined. Therefore, the inclination angle θ of the lens barrel can be continuously varied in the wide range including the angle of 0° to 20°, which is suitable for the long time observation using the microscope. The same advantage as the first embodiment can be expected. Moreover, an optical path for photographing is formed on the upper section of one of right and left optical lenses 105, 105a such that the twice reflecting triangular prism 110 is movable to the direction perpendicular to the paper surface of FIG. 3. Thereby, the present invention can be easily applied to a three-eye barrel.

In the above-explained second embodiment, the triangular prisms 111, 111a were individually prepared to correspond to the incident beam from each of the image forming lenses 105, 105a. However, one triangular prism 111 and the other triangular prim 111a may be combined with each other to be formed as one prism.

Thus, according to the present invention, there can be provided a stereo-microscope, which can observe a real image in a condition that an inclination angle of the barrel can be continuously varied in a range resisting a long time observing, with a simple structure and at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

I claim:

1. A lens barrel for use in a stereo-microscope, comprising:

a static section;

an image forming lens section provided in said static section;

a movable section rotatably supported by said static section;

an eyepiece section supported by said movable section;

an erecting optical section, provided in said static section, for erecting an observation image beam from a beam emitted from said image forming lens section;

a reflecting optical section for reflecting the observation image beam erected by said erecting optical section;

a guiding optical section, provided in said movable section, for guiding the observation image beam reflected by said reflecting optical section to said eyepiece section; and a varying mechanical section for varying an angle of a reflective surface of said reflecting optical section such that the observation image beam reflected by said reflecting optical section is guided to said eyepiece section through said guiding optical section in accordance with a rotation of said movable section from said static section;

wherein said erecting optical section comprises first and second triangular prisms and a rectangular prism, said first triangular prism having a beam emission surface which contacts a first half of a bottom surface of said rectangular prism, and said second triangular prism having a beam incident surface which contacts a second half of said bottom surface of said rectangular prism; and wherein the beam emitted from said image forming lens section is made incident onto a beam incident surface of said first triangular prism, and the observation image beam is emitted from a bottom side of said second triangular prism.

2. The lens barrel according to claim 1, wherein said varying mechanism section comprises a member, rotatably provided in said static section to vary the angle of the reflective surface of said reflecting optical section, for supporting said reflecting optical section, and a reduction mechanism, provided in said static section and said movable section, for rotating said member in a same direction as said movable section by a half amount of rotation of said movable section in accordance with the rotation of said movable section.

3. The lens barrel according to claim 2, wherein said varying mechanism section further comprises an urging member for urging the member for supporting said reflecting optical section in a rotational direction against said movable section.

4. The lens barrel according to claim 3, wherein said urging member comprises a twist coil spring provided between the member for supporting said reflecting optical section and said movable section.

5. The lens barrel according to claim 1, wherein said reflecting optical section comprises a reflection mirror holding frame rotatably supported by said movable section in a state that a rotation shaft center of said movable section is used as a shaft center, a reflective surface parallel to the rotation shaft center of said movable section and including said rotation shaft center, and a reflection mirror fixed to said reflection mirror holding frame, wherein said reduction mechanism comprises a first gear fixed to said static section in the state that the rotation shaft center of said movable section is used as the shaft center, a second gear rotatably supported by said movable section to be engaged with said first gear, a third gear fixed to said second gear to be concentric with said second gear, and a fourth gear fixed to said reflection mirror holding frame in the state that the rotation shaft center of said movable section is used as the shaft center to be engaged with said third gear, and wherein a ratio of gear tooth in said first to fourth gears is set as follows:

$$\frac{\text{number of gear tooth of first gear}}{\text{number of gear tooth of second gear}} \times$$

$$\frac{\text{number of gear tooth of third gear}}{\text{number of gear tooth of fourth gear}} = \frac{1}{2}$$

6. The lens barrel according to claim 1, wherein said image forming lens section comprises a right image forming lens and a left image forming lens.

7. The lens barrel according to claim 1, wherein said erecting optical section comprises a right erecting optical element and a left erecting optical element.

8. The lens barrel according to claim 1, wherein said reflecting optical section comprises a right rotation mirror and a left rotation mirror.

9. The lens barrel according to claim 1, wherein said guiding optical section comprises a right guiding optical element and a left guiding optical element.

10. The lens barrel according to claim 1, wherein said guiding optical section comprises a diamond-shaped prism.

11. The lens barrel according to claim 1, wherein said eyepiece section comprises a right eyepiece lens, a left eyepiece lens, and a mechanism for adjusting a distance between said right and left eyepiece lenses in accordance with an eye width.

12. The lens barrel according to claim 1, wherein an angle formed by an optical axis of the beam emitted from said image forming lens section and an optical axis of the observation image beam emitted from said erecting optical section is set to 15 to 45°.

13. A stereo-microscope comprising:
a main body;
an object lens provided in said main body;
a magnification varying section, provided in said main body, for receiving a beam from said object lens and for varying a magnification of each of a right optical image and a left optical image based on said beam; and
a lens barrel provided in said main body, said lens barrel comprising:
    a static section provided in said main body;
    an image forming lens section, provided in said static section, for image-forming each of a right beam and a left beam emitted from said magnification varying section;
    a movable section rotatably supported by said static section;
    an eyepiece section supported by said movable section;
    an erecting optical section, provided in said static section, for erecting each of a right optical image beam and a left optical image beam from the right and left beams image-formed by said image forming lens;
    a reflecting optical section for reflecting the right and left optical image beams erected by said erecting optical section;
    a guiding optical section, provided in said movable section, for guiding each of the right and left optical image beams reflected by said reflecting optical section to said eyepiece section; and
    a varying mechanical section for varying an angle of a reflective surface of said reflecting optical section such that each of the right and left optical image beams reflected by said reflecting optical section is guided to said eyepiece section through said guiding optical section in accordance with a rotation of said movable section from said static section;
    wherein said erecting optical section comprises first and second triangular prisms and a rectangular prism, said first triangular prism having a beam emission surface which contacts a first half of a bottom surface of said rectangular prism, and said second triangular prism having a beam incident surface which contacts a second half of said bottom surface of said rectangular prism; and
    wherein the right and left beams image-formed by said image-forming lens section are made incident onto a beam incident surface of said first triangular prism, and the right and left optical image beams are emitted from a bottom side of said second triangular prism.

14. An optical device comprising:
a main body;
an object lens provided in said main body;
an optical section, provided in said main body, for receiving a beam emitted from said object lens;
a static section provided in said main body;
a movable section rotatably supported by said static section;
an eyepiece supported by said movable section;
an erecting optical section, provided in said static section, for erecting an optical image beam from the beam which is received by said optical section;

a reflecting optical section, provided in said static section, for reflecting the optical image beam erected by said erecting optical section;

a guiding optical section, provided in said movable section, for guiding the optical image beam reflected by said reflecting optical section to said eyepiece; and a varying mechanical section for varying an angle of a reflective surface of said reflecting optical section such that the optical image beam reflected by said reflecting optical section is guided to said eyepiece through said guiding optical section in accordance with a rotation of said movable section from said static section;

wherein said erecting optical section comprises first and second triangular prisms and a rectangular prism, said first triangular prism having a beam emission surface which contacts a first half of a bottom surface of said rectangular prism, and said second triangular prism having a beam incident surface which contacts a second half of said bottom surface of said rectangular prism; and wherein the beam which is received by said optical section is made incident onto a beam incident surface of said first triangular prism, and the optical image beam is emitted from a bottom side of said second triangular prism.

15. A lens barrel for use in a stereo-microscope, comprising:

a static section;

an image forming lens section provided in said static section;

a movable section rotatably supported by said static section;

an eyepiece section supported by said movable section;

an erecting optical section, provided in said static section, for erecting an observation image beam from a beam emitted from said image forming lens section;

a reflecting optical section for reflecting the observation image beam erected by said erecting optical section;

a guiding optical section, provided in said movable section, for guiding the observation image beam reflected by said reflecting optical section to said eyepiece section; and a varying mechanical section for varying an angle of a reflective surface of said reflecting optical section such that the observation image beam reflected by said reflecting optical section is guided to said eyepiece section through said guiding optical section in accordance with a rotation of said movable section from said static section;

wherein said erecting optical section comprises first and second triangular prisms and a rectangular prism, said second triangular prism having a beam incident surface which is provided opposite to a beam emission surface of said first triangular prism, and said second triangular prism having a beam emission surface which contacts a half of a bottom surface of said rectangular prism; and wherein the beam emitted from said image forming lens section is made incident onto a bottom surface of said first triangular prism, and the observation image beam is emitted from a bottom side of said rectangular prism.

16. The lens barrel according to claim 15, wherein said image forming lens section comprises a right image forming lens and a left image forming lens.

17. The lens barrel according to claim 15, wherein said erecting optical section comprises a right erecting optical element and a left erecting optical element.

18. The lens barrel according to claim 15, wherein said reflecting optical section comprises a right rotation mirror and a left rotation mirror.

19. The lens barrel according to claim 15, wherein said guiding optical section comprises a right guiding optical element and a left guiding optical element.

20. The lens barrel according to claim 15, wherein said guiding optical section comprises a diamond-shaped prism.

21. The lens barrel according to claim 15, wherein said eyepiece section comprises a right eyepiece lens, a left eyepiece lens, and a mechanism for adjusting a distance between said right and left eyepiece lenses in accordance with an eye width.

22. The lens barrel according to claim 15, wherein an angle formed by an optical axis of the beam emitted from said image forming lens section and an optical axis of the observation image beam emitted from said erecting optical section is set to 15 to 45°.

23. A stereo-microscope comprising:

a main body;

an object lens provided in said main body;

a magnification varying section, provided in said main body, for receiving a beam from said object lens and for varying a magnification of each of a right optical image and a left optical image based on said beam; and a lens barrel provided in said main body, said lens barrel comprising:

a static section provided in said main body;

an image forming lens section, provided in said static section, for image-forming each of a right beam and a left beam emitted from said magnification varying section;

a movable section rotatably supported by said static section;

an eyepiece section supported by said movable section;

an erecting optical section, provided in said static section, for erecting each of a right optical image beam and a left optical image beam from the right and left beams image-formed by said image forming lens;

a reflecting optical section for reflecting the right and left optical image beams erected by said erecting optical section;

a guiding optical section, provided in said movable section, for guiding each of the right and left optical image beams reflected by said reflecting optical section to said eyepiece section; and a varying mechanical section for varying an angle of a reflective surface of said reflecting optical section such that each of the right and left optical image beams reflected by said reflecting optical section is guided to said eyepiece section through said guiding optical section in accordance with a rotation of said movable section from said static section;

wherein said erecting optical section comprises first and second triangular prisms and a rectangular prism, said second triangular prism having a beam incident surface which is provided opposite to a beam emission surface of said first triangular prism, and said second triangular prism having a beam emission surface which contacts a half of a bottom surface of said rectangular prism; and wherein the right and left beams image-formed by said image forming lens section are made incident onto a bottom surface of said first triangular prism, and the right and left optical image beams are emitted from a bottom side of said rectangular prism.

24. An optical device comprising:

a main body;

an object lens provided in said main body;

an optical section, provided in said main body, for receiving a beam emitted from said object lens;

a static section provided in said main body;

a movable section rotatably supported by said static section;

an eyepiece supported by said movable section;

an erecting optical section, provided in said static section, for erecting an optical image beam from the beam which is received by said optical section;

a reflecting optical section, provided in said static section, for reflecting the optical image beam erected by said erecting optical section;

a guiding optical section, provided in said movable section, for guiding the optical image beam reflected by said reflecting optical section to said eyepiece; and a varying mechanical section for varying an angle of a reflective surface of said reflecting optical section such that the optical image beam reflected by said reflecting optical section is guided to said eyepiece through said guiding optical section in accordance with a rotation of said movable section from said static section;

wherein said erecting optical section comprises first and second triangular prisms and a rectangular prism, said second triangular prism having a beam incident surface which is provided opposite to a beam emission surface of said first triangular prism, and said second triangular prism having a beam emission surface which contacts a half of a bottom surface of said rectangular prism; and wherein the beam which is received by said optical section is made incident onto a bottom surface of said first triangular prism, and the optical image beam is emitted from a bottom side of said rectangular prism.

* * * * *